Dec. 30, 1947. M. H. THOMAS 2,433,677
CONSTRUCTION OF ROOFS AND THEIR SUPPORTS
Filed May 17, 1946 9 Sheets-Sheet 1

Dec. 30, 1947.  M. H. THOMAS  2,433,677
CONSTRUCTION OF ROOFS AND THEIR SUPPORTS
Filed May 17, 1946  9 Sheets-Sheet 2
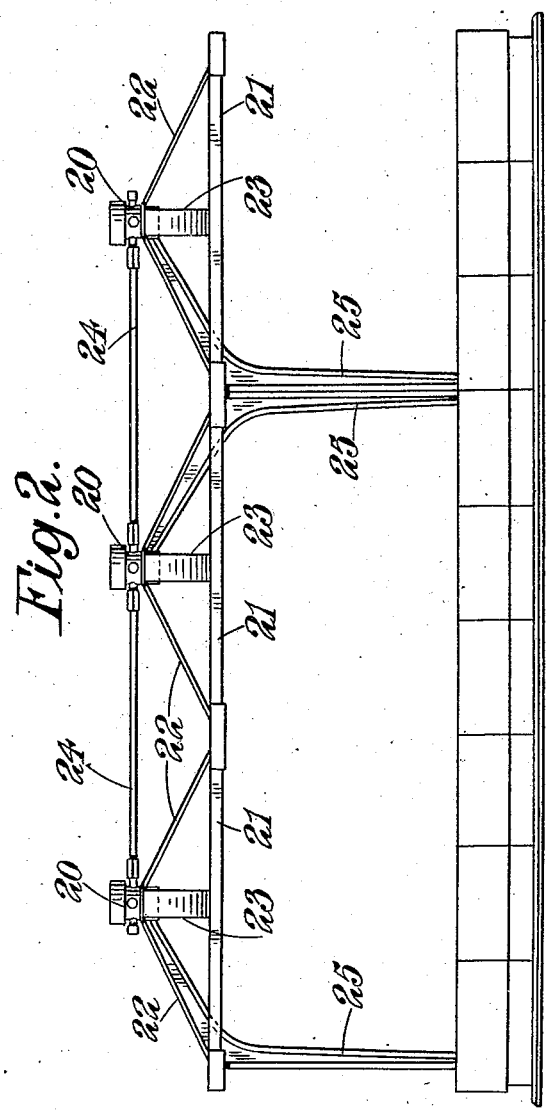

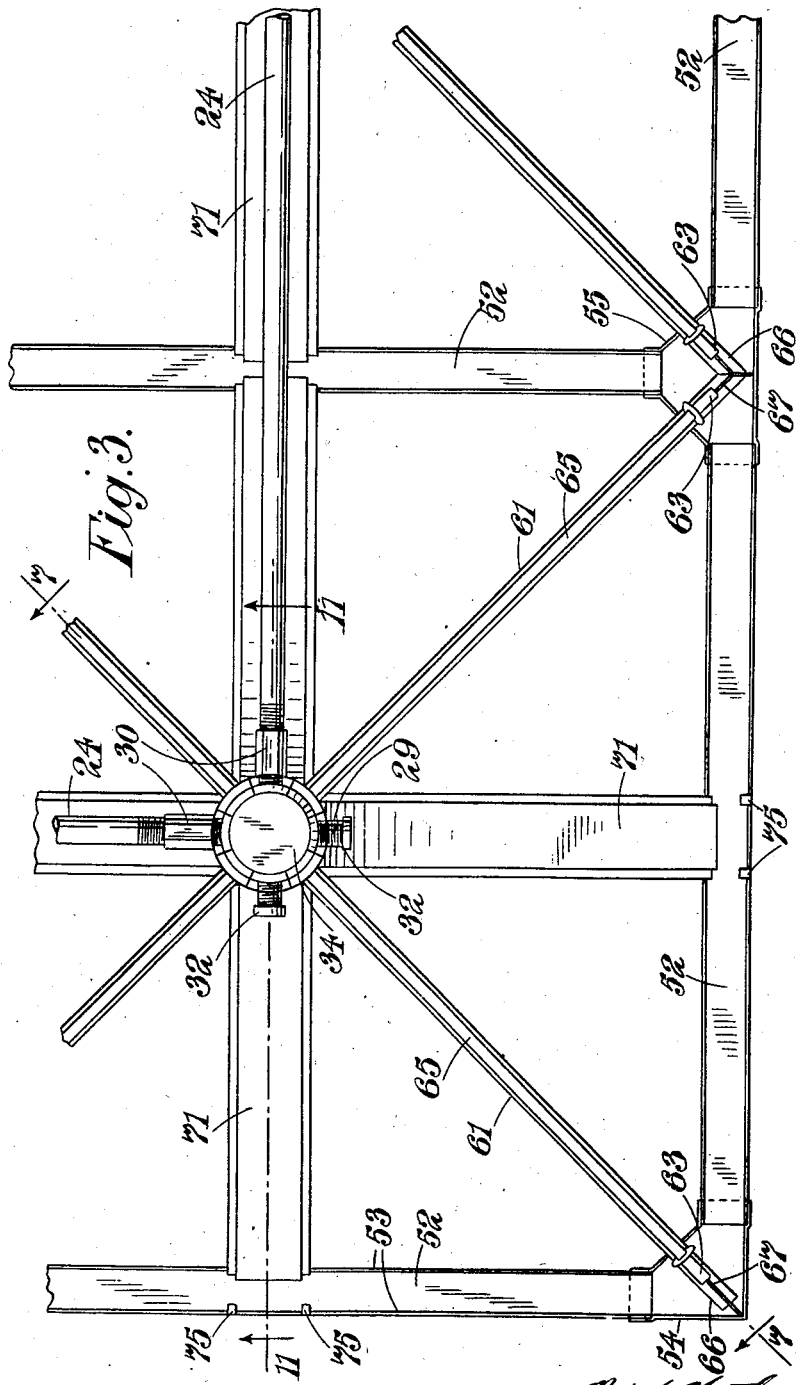

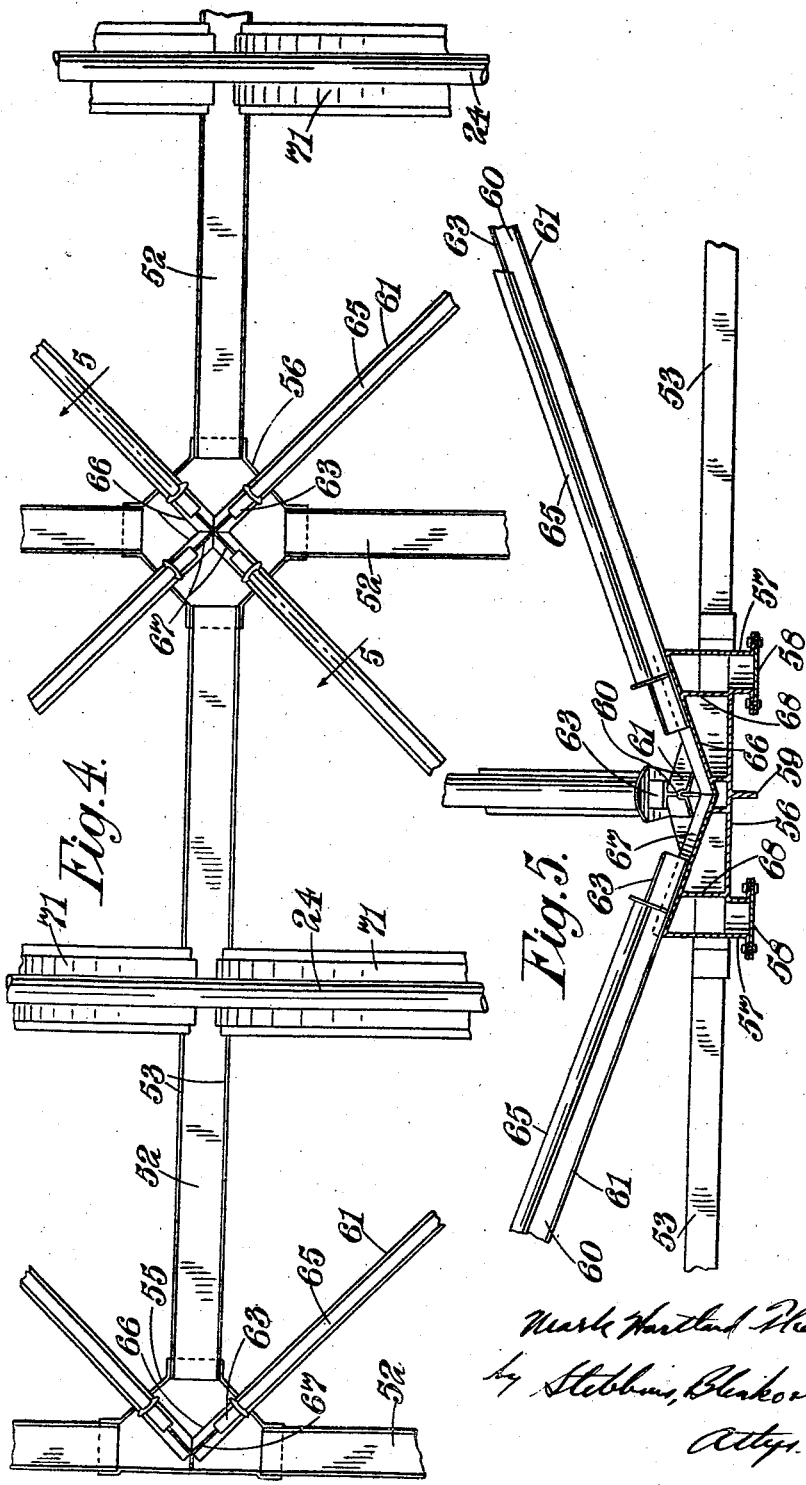

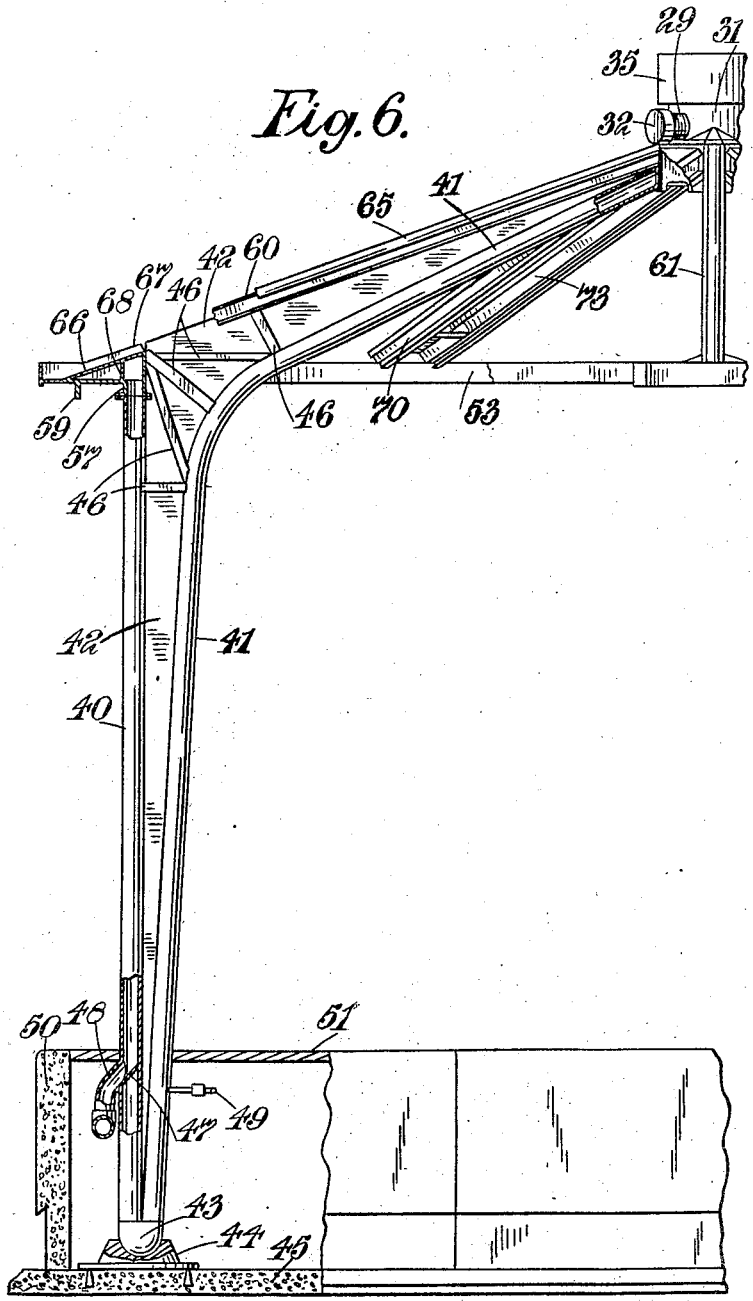

Dec. 30, 1947.  M. H. THOMAS  2,433,677
CONSTRUCTION OF ROOFS AND THEIR SUPPORTS
Filed May 17, 1946  9 Sheets-Sheet 6
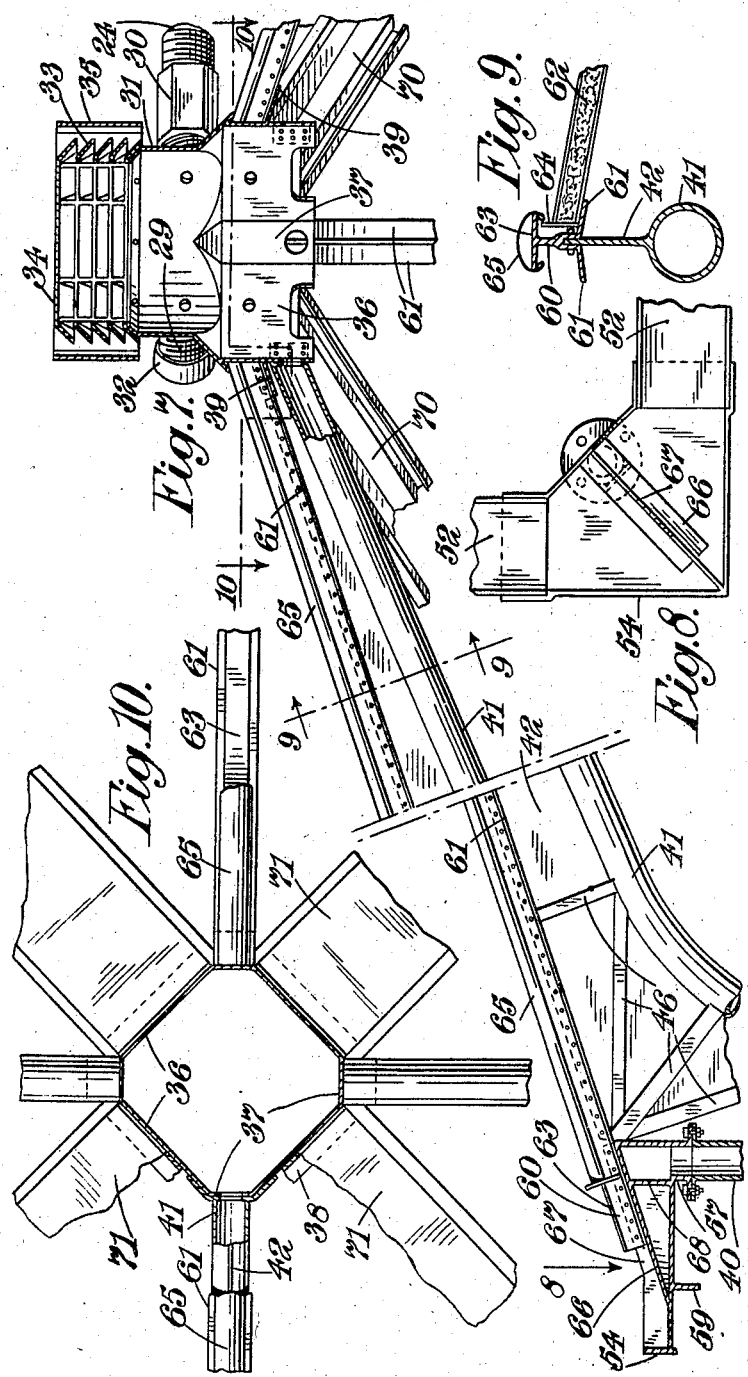

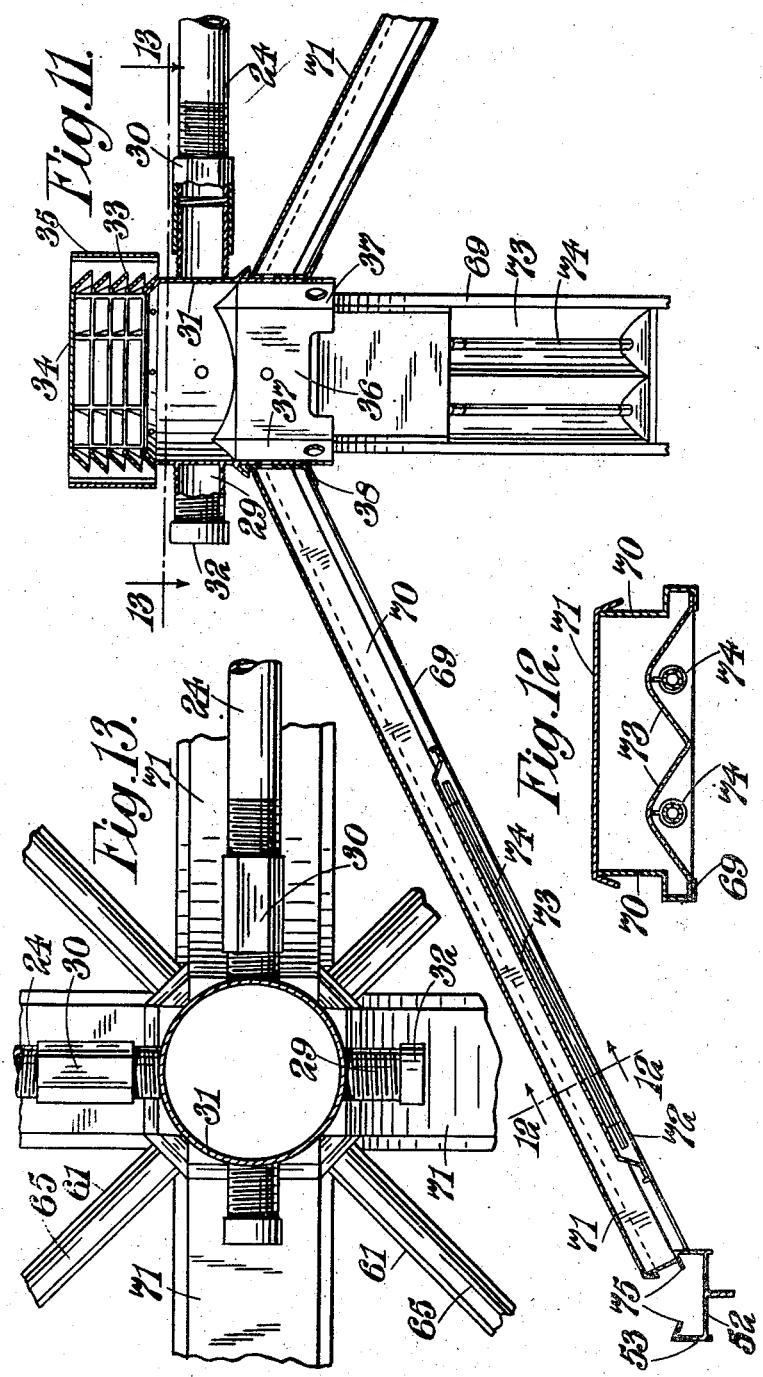

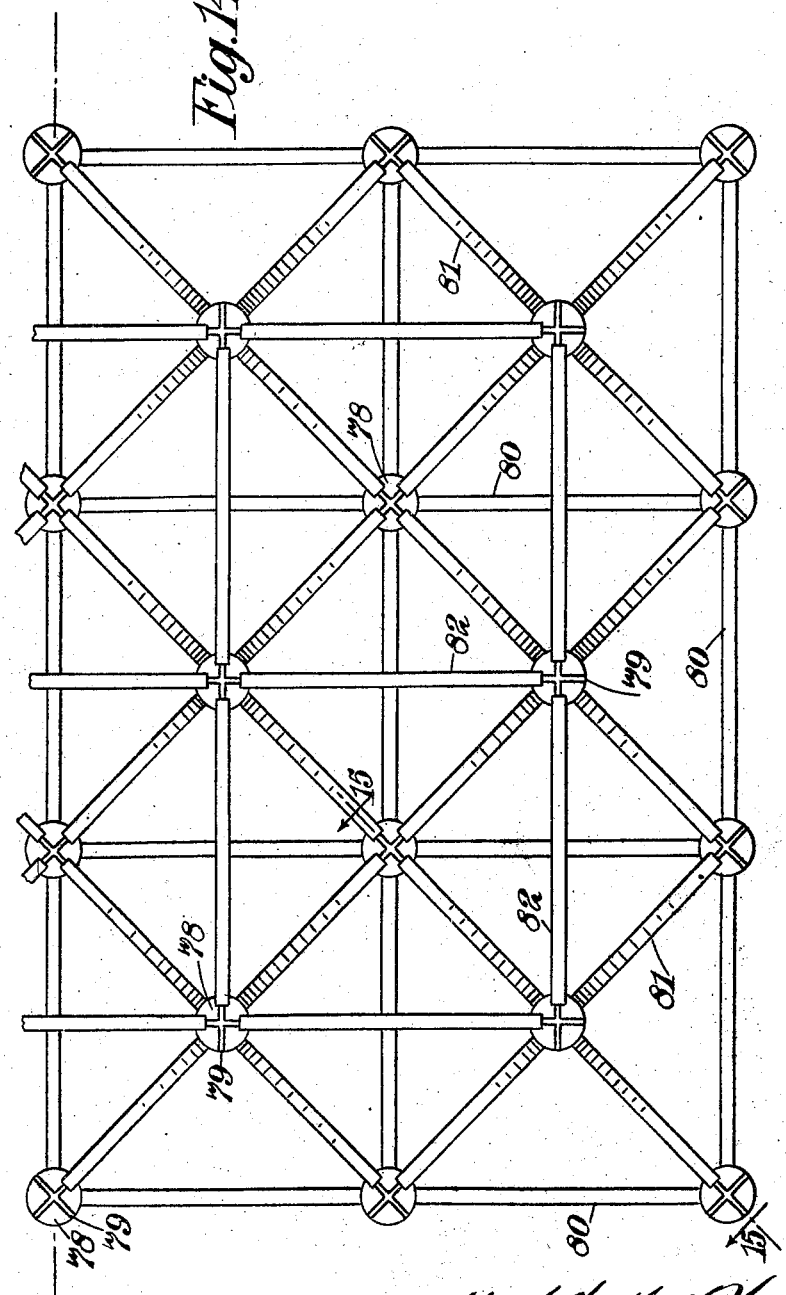

Dec. 30, 1947.   M. H. THOMAS   2,433,677
CONSTRUCTION OF ROOFS AND THEIR SUPPORTS
Filed May 17, 1946   9 Sheets-Sheet 9
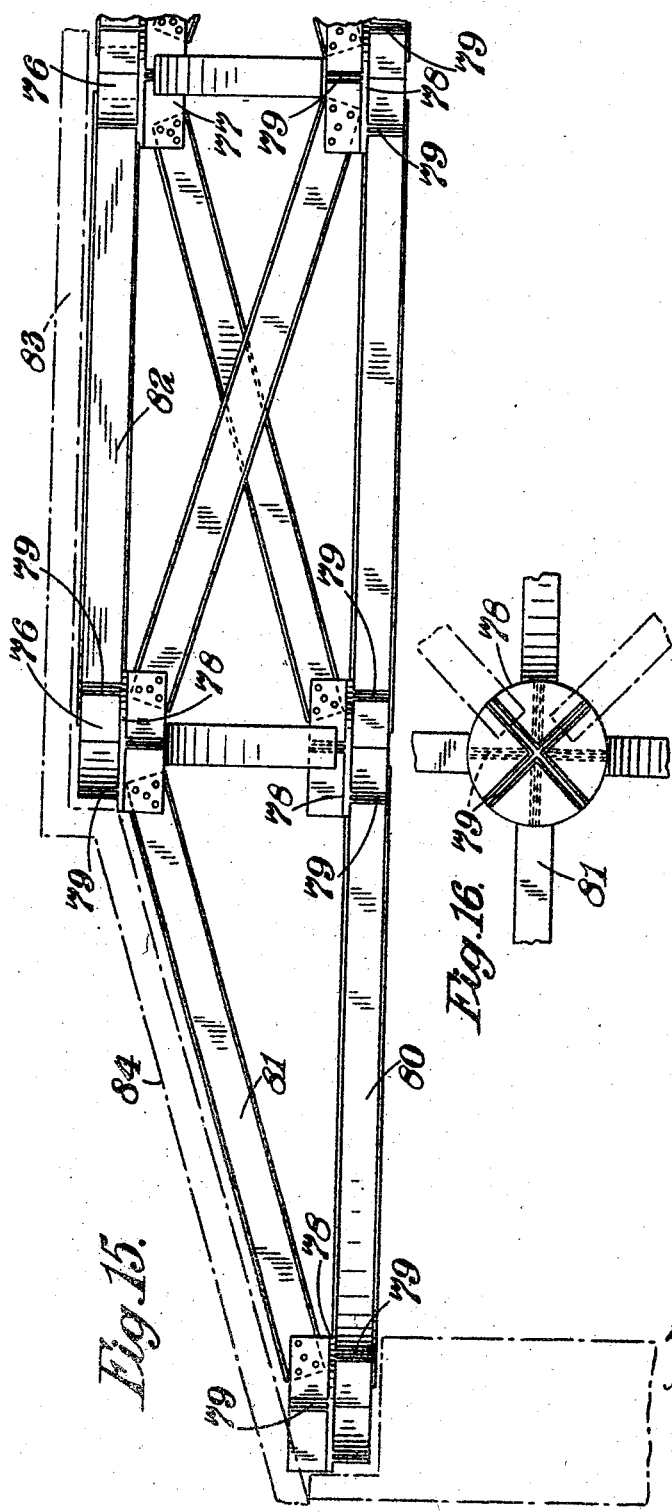
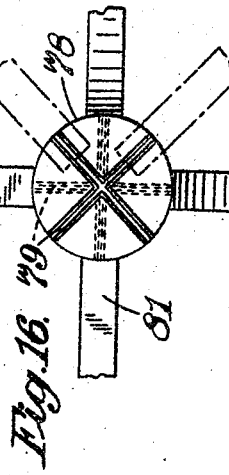

Patented Dec. 30, 1947

2,433,677

UNITED STATES PATENT OFFICE 2,433,677

CONSTRUCTION OF ROOFS AND THEIR SUPPORTS

Mark Hartland Thomas, London, England, assignor of one-half to United Dairies Limited, London, England, a British company Application May 17, 1946, Serial No. 670,462
In Great Britain May 18, 1945

4 Claims. (Cl. 108—1)

This invention is for improvements in or relating to the construction of roofs. The invention is concerned with roofs of the type which comprise a plurality of pyramidal units, each comprising framing members connected together to form the outline of the base of the pyramid and rafters converging from said base outline to the apex, in combination with a coupling directly connecting together the apices of each two adjacent pyramidal units. The invention has for one of its objects to provide improved prefabricated parts for the roof which can be readily dismounted to enable the floor covered by the roof to be changed in area or shape.

According to the primary feature of the invention there is provided a roof structure comprising a plurality of pyramidal units, each comprising framing members connected together to form the outline of the base of the pyramid, an apex junction member and rafters converging from said base outline to the apex junction member. which pyramidal units are arranged with their base outlines in close juxtaposition and connected together, in combination with a rigid coupling directly connecting the apex junction members of each two adjacent pyramidal units. The shape of the base of the pyramidal unit will usually be square, hexagonal or triangular (equilateral). but in some circumstances other suitable shapes may be adopted. It will be appreciated that the three conformations, just mentioned, are capable of being closely bedded together, side by side, and offer considerable scope for the standardization of individual parts or elements. By the use of a roof embodying the invention, variation in the floor area covered by the roof may be readily effected by changing the number or the position of the pyramidal units, and the rigid couplings will ensure that the whole is braced together in such a way that the pyramidal units can assist to support each other.

If desired. expense and weight may be saved by arranging that one framing member is common to the base outlines of each two adjacent pyramidal units.

The invention also enables the number of pillars required for supporting the roof to be reduced, and their disposition to be such as to leave chosen parts of the floor area unobstructed. Thus, a feature of the invention provides a roof structure in which there are supporting pillars under corners of the composite base line of the assembly, which structure is characterised in that the pillars are omitted from under corners where the load is transferred through the said rigid couplings and apex junction members to pillars under other corners. In such an assembly, the inner floor area, or parts thereof, may be left without pillars, or the outer margin of the floor area may be left unobstructed and be covered by a cantilever-supported canopy, the load of some of the roof units being carried, through the apex junction members and rigid couplings, by the pillars under other roof units.

The invention also includes an apex junction member which is reversible and usable either at the apex of a rectangular pyramidal unit or at a corner of the base outline of the said unit to connect frame members together, and which comprises in two separate portions of its depth two series of housings for the ends of said frame members, which housings in each series are angularly separated from each other about the vertical axis of the junction member with those in the one series staggered with respect to those in the other series.

For a more complete understanding of the invention, there will now be described by way of example only and with reference to the accompanying drawings, certain constructions and arrangements of roof structure according to the invention. It is to be understood however. that the invention is not restricted to the precise constructional details set forth.

In the drawings:

Figure 1 is a plan of a portion of one construction of roof, with the roof covering removed;

Figure 2 is an elevation corresponding to a part of Figure 1;

Figure 3 is a fragmentary plan, corresponding to a part of Figure 1, but on a scale larger than that of Figure 1;

Figure 4 is a fragmentary plan, corresponding to another part of Figure 1, on the same scale as that of Figure 3;

Figure 5 is a detail section on the line 5—5 of Figure 4;

Figure 6 is a fragmentary elevation, partly in section. corresponding to Figure 2, but on a scale larger than that of Figure 2;

Figure 7 is a detail section on the line 7—7 of Figure 3, but on a scale larger than that of Figure 3;

Figure 8 is a fragmentary plan looking in the direction indicated by the arrow 8 in Figure 7, and on the same scale as that of Figure 7;

Figure 9 is a detail section on the line 9—9 of Figure 7;

Figure 10 is a detail section on the line 10—10 of Figure 7;

Figure 11 is a detail section on the line 11—11 of Figure 3, on the same scale as that of Figure 7;

Figure 12 is a detail section on the line 12—12 of Figure 11;

Figure 13 is a detail section on the line 13—13 of Figure 11;

Figure 14 is a plan, corresponding to Figure 1, of a modified construction of roof, with the roof covering removed;

Figure 15 is a section on the line 15—15 of Figure 14, but on a scale larger than that of Figure 14, and Figure 16 is a plan of certain of the parts shown in Figure 15.

Like reference numerals indicate like parts throughout the drawings.

Before proceeding to the detail description of the construction and arrangement of the parts, reference is directed to Figures 1 and 2 which give a general idea of one form of roof and supports therefor, according to the invention. The portion of the roof shown in Figure 1 is composed of six pyramidal roof units, each of which has an apex junction member, indicated generally by the numeral 20, and a square base outline provided by members 21. Each unit also comprises diagonal frame members 22 and diametral frame members 23. Couplings 24 directly connect the junction members 20 in adjacent units, and some of the members 21 form part of two adjacent units. Supporting pillars are shown at 25 (Figure 2), and in the portion of the roof shown in Figure 1 they are only located under the positions marked 26, 27 and 28, thus leaving a considerable part of the floor area and in particular the right-hand margin of the floor area, as seen in Figures 1 and 2, without pillars. Two pillars 25, arranged side by side, are located at each of the positions 27 and 28. The load of some of the roof units is carried, through the junction members 20 and couplings 24, by the pillars under other roof units, and the roof over the said margin of the floor area is cantilever-supported. The location of the supporting pillars is, of course, variable according to circumstances.

Referring now to Figures 3, 4, 7, 10, 11 and 13, it will be seen that the apex junction member therein shown is of general tubular shape with open ends. In these figures, the general reference numeral 20 is omitted in favour of other numerals directed to the detail parts of the junction member. It has laterally-directed screwed bosses 29 to any of which the screwed portions of couplings 24 can be connected by sleeves 30 each with right and left hand screwthreads. These sleeves 30 form part of the coupling, and enable the coupling to be readily mounted in position and dismounted and have its effective length appropriately modified. The bosses 29 reach out radially from the upper part 31 of the junction member, which part is cylindrical, and the number of bosses provided with depend upon the shape of the base of the pyramidal roof unit. As shown, this is square, so there are four equally-spaced bosses. Any not used for coupling, may be fitted with end covers 32.

The junction member may be used for ventilating the space below the roof, and for this purpose is shown as having on its upper end a laterally-louvred cowl 33 with a closed top 34 and a surrounding ring 35 which leaves an annular draught channel between its inner surface and the mouths of the louvre openings. This cowl and surrounding ring arrangement is well known, per se.

Below the aforesaid cylindrical part 31, the junction member is octagonal for the remainder of its length, for a square pyramidal roof unit. The octagonal shape is not regular, but alternate sides 36 are longer than the others, 37, the sides 36 underlying the bosses 29. The sides 36 have outwardly-reaching downwardly-sloping flanges 38 (see particularly Figure 11), and, at a higher level, the sides 37 have similar flanges 39 (see particularly Figure 7), these flanges being provided for supporting, and having suitably connected to them, members of the pyramidal framework, as will be described below.

The roof-supporting pillars or "crucks" are shown in detail in Figures 6 and 7 in which the general reference numeral 25, aforesaid, is omitted in favour of other numerals directed to the detail parts. The cruck comprises two tubular members 40 and 41, joined by a web 42. The member 40 terminates at its upper end at the base outline of the roof unit, but the member 41 and the web 42 extend obliquely upwards past the said base outline to the octagonal part of the apex junction member. The members 40 and 41 are joined at their lower ends by a connection 43 of smooth U-shape which is received in a bearing 44 carried in the foundation 45 of the structure, the bearing being so shaped as to permit the cruck to rock slightly. The members 40 and 41 converge towards the connection 43, and the web 42 is reinforced by stiffeners 46 at the bend in the cruck. The member 40 may be used as a down-comer for rain water, and for this purpose its lower portion is sealed off by a partition 47 and a branch 48 is provided for the conveyance of the rain water. The member 41 has its interior open to the interior of the apex junction member and can be used to house an electric lighting cable, a connection for which is shown at 49. As shown in Figure 6, the branch 48 and connection 49 are housed in a space enclosed by the foundation 45, an outside wall 50 and a floor 51.

As stated above, it is known to use a gutter as a frame member of a roof, and the base outline members indicated by the general reference numeral 21 in Figures 1 and 2 are gutters which constitute frame members of the pyramidal roof unit. Details of these gutters are shown in Figures 3, 4, 5, 6, 7 and 8, the reference numeral 21 being omitted therein in favour of other numerals directed to the detail parts. The lengths of guttering are plain channels comprising a base 52 and sides 53 with appropriate connecting members at the corners. At 54 there is shown a connecting member for two lengths of guttering at right-angles to each other, at 55 a connecting member for three lengths of guttering and at 56 a connecting member for four lengths of guttering. To convey rain water from the gutters to the members 40 of the crucks, the connecting members 54, 55, 56 are ported and formed on their under faces with tubular connections 57 leading from said ports to constitute continuations of the members 40, and any of such tubular connections as are not required to be used are sealed off as shown at 58 (Figure 5). The bases of the connecting members 54, 55, 56 may be stiffened by ribs 59.

The frame members indicated by the general reference numeral 22 in Figures 1 and 2 are rafters, and details of their construction are shown in Figures 3, 4, 5, 6, 7, 9 and 10, in which the reference numeral 22 is omitted in favour of other numerals directed to detail parts. Referring particularly to Figure 9, the rafters are of modified T-shaped cross-section with a longitudinal groove formed edgewise in the base of the stem 60 of the T and with oblique flanges 61 reaching out one from each side of the groove to support the margins of the roof covering 62 which reaches under the head 63 of the T with its end surface close to the stem 60. The upper edge of an end strip 64 on the roof covering lies closely under the head 63 and a resilient capping strip 65 is sprung on to the latter to provide dripping points outside the end strip 64. The web 42 of the cruck is received in the said groove in the stem 60 so that the cruck and rafter may be connected together along substantially the whole length of the latter.

The upper ends of the rafters are received upon and suitably connected to the aforesaid flanges 39 on the octagonal part of the apex junction member, and the lower ends of the rafters are received on and connected to the gutter connecting members 54, 55, 56. For this purpose, each of the latter is formed with a bridge 66 which reaches obliquely from the upper edge of its inner side wall down to its base in alignment with the lower end of the rafter in such manner as to carry the latter. A web 67 upstanding from the bridge 66 is received in the longitudinal groove in the stem 60 of the rafter in a manner similar to that in which the web 42 of the cruck is received in the groove, the two webs being disposed endwise of each other. The bridge 66 is located over the port in the base of the connecting member 54, 55 or 56 which establishes communication with the member 40 of the cruck, and a strut 68 is provided which reaches to the underside of the bridge 66 from a position directly or substantially directly over the cruck member 40. Thus the weight on the rafter is transmitted directly to the cruck member. The cruck is structurally continuous with the framework of the roof unit.

The frame members indicated by the general reference numeral 23 in Figures 1 and 2 are lighting casings, and details of their construction are shown in Figures 3, 6, 11, 12 and 13, in which the reference numeral 23 is omitted in favour of other numerals directed to detail parts. As will be seen from Figure 12, these lighting casings, which need not necessarily be designed to take up any of the stress on the roof unit, are of rectangular boxlike cross-section composed of a base 69, sides 70 and a cover 71. Above an aperture 72 in the base is inset an angular false base 73 which supports strip lighting fittings 74 and serves as a reflector therefor. The upper ends of the lighting casings are received upon and suitably connected to the aforesaid flanges 38 on the octagonal part of the apex junction member, and the lower ends of the lighting casings are received on and connected to the gutter. For this purpose, the side walls 53 of the latter are provided at suitable locations with short inturned oblique flanges 75 aligned with the lighting casings. The interior of the lighting casing is open to the interior of the apex junction member to permit the passage of an electric cable which can also reach through the coupling 24 between two adjacent apex junction members.

Any suitable external walls and internal partitions may be mounted on the roof supports and the disposition of the walls and partitions may be changed without affecting the roof; also as explained earlier herein the invention permits a wide choice in the number and disposition of the roof supports. When an extra roof unit is added in order to cover additional floor area, it is not always essential to increase the total number of roof supports. The roof is readily accessible over its whole area and there need not be any excrescences for carrying away rain water or housing electric cables. The parts of the pyramidal framework, the couplings and the roof supports can readily be standardised so that changes in the floor area to be covered can be effected simply and quickly.

In the construction shown in Figures 14–16, an apex junction member of a form different from that described above is adopted which has the advantage of enabling I girders of the same cross-sectional dimensions to be used for the base outline frame members, the rafters and the couplings. The junction member is reversible and usable either at the apex of a rectangular pyramidal roof unit or at a corner of the base outline of the unit to connect the I girders together. The depth of the junction member is in two portions 76 and 77 connected by a disc 78. Each portion 76 and 77 provides a series of four housings 79 to receive and be connected to the ends of the stems of the I girders, the flanges on the latter being suitably cut away as necessary. The housing 79 in each series are angularly separated from each other about the vertical axis of the junction member, with those in one series staggered with respect to those in the other series. In Figures 14–16, the base outline frame members are shown at 80, the rafters at 81 and the couplings at 82. This construction is adapted to receive a flat roof covering 83 over the main area of the roof with a sloping marginal covering 84.

It is to be understood that the invention is not restricted to the precise constructional details set forth.

I claim:

1. A roof structure comprising a plurality of pyramidal units, each comprising framing members connected together to form the outline of the base of the pyramid, an apex junction member and rafters converging from said base outline to the apex junction member, which pyramidal units are arranged with their base outlines in close juxtaposition and connected together, in combination with a rigid coupling directly connecting the apex junction members of each two adjacent pyramidal units.

2. A roof structure according to claim 1, in which one framing member is common to the base outlines of each two adjacent pyramidal units.

3. A roof structure according to claim 1, in which there are supporting pillars under corners of the composite base line of the assembly, characterized in that the pillars are omitted from under corners where the load is transferred through the said rigid couplings and apex junction members to pillars under other corners.

4. A roof structure according to claim 1, comprising an apex junction member which is reversible and usable either at the apex of a rectangular pyramidal unit or at a corner of the base outline of the said unit to connect frame members together, and which comprises in two separate portions of its depth two series of housings for the ends of said frame members, which housings in each series are angularly separated from each other about the vertical axis of the junction member with those in the one series staggered with respect to those in the other series.

MARK HARTLAND THOMAS.

REFERENCES CITED

The following references are of record in the file of this patent:

UNITED STATES PATENTS

| Number | Name | Date |
|---|---|---|
| Re. 15,133 | Ballinger | June 28, 1921 |
| 910,776 | Berne | Jan. 26, 1909 |

FOREIGN PATENTS

| Number | Country | Date |
|---|---|---|
| 418,308 | France | 1910 |
| 536,482 | Germany | 1932 |